United States Patent [19]

Mersfelder et al.

[11] Patent Number: 4,547,375

[45] Date of Patent: Oct. 15, 1985

[54] GEL FORMATION IN TOMATO PRODUCTS

[75] Inventors: Robert E. Mersfelder; Albert M. Ehrman, both of Cincinnati, Ohio

[73] Assignee: The Procter & Gamble Co., Cincinnati, Ohio

[21] Appl. No.: 486,634

[22] Filed: Apr. 20, 1983

[51] Int. Cl.$^4$ .................. A23L 1/212; A23L 1/24
[52] U.S. Cl. .................... 426/52; 426/589; 426/615; 426/638; 426/520
[58] Field of Search .............. 426/589, 615, 638, 520, 426/52

[56] References Cited

U.S. PATENT DOCUMENTS

| | | | |
|---|---|---|---|
| 3,326,698 | 6/1967 | Sakamoto | 426/520 |
| 3,873,753 | 3/1975 | Nelson et al. | 426/615 |
| 4,194,016 | 3/1980 | Weaver et al. | 426/520 |
| 4,437,934 | 3/1984 | Nelson et al. | 426/615 |

*Primary Examiner*—Jeanette Hunter
*Attorney, Agent, or Firm*—Nancy S. Mayer; Rose Ann Dabek; Richard C. Witte

[57] ABSTRACT

Methods for minimizing flavor loss and controlling the consistency of a tomato product containing one or more members of the Allium botanical genus when processed primarily at temperatures below those commonly used in commercial practice are disclosed. Product consistency can be regulated through the use of processing techniques which either promote or prevent gel formation in the product.

14 Claims, No Drawings

GEL FORMATION IN TOMATO PRODUCTS

TECHNICAL FIELD

This invention relates to methods for minimizing flavor loss and controlling the consistency of a tomato product containing one or more members of the Allium botanical genus when processed primarily at temperatures below those used in commercial practice through regulation of gel formation in the product.

BACKGROUND OF THE INVENTION

In the processing of tomato-based products, such as tomato juice, tomato paste, catsup, and the like, the product consistency is dependent upon the presence of pectic substances. The freshly cut or crushed tomato fruit must be quickly heated to above 180° F. (82° C.) in order to inactivate pectin enzymes naturally present in the fruit. If temperatures lower than this are employed, the breakdown of pectic substances by the enzymes will result in product of low consistency, that is, thin and watery products.

Upon maceration of tomatoes, the enzyme pectinmethylesterase rapidly demethylates the pectic substances naturally present in tomatoes producing pectic and pectinic acids. These acids are then depolymerized by polygalacturonase. The enzyme polygalacturonase (also known as pectinase or pectic acid depolymerase) rapidly depolymerizes pectic and pectinic acids into smaller polygalacturonic acids and finally into D-galacturonic acid and galacturonic acid methyl ester. The resulting lack of pectic substances is responsible for a loss of colloidal properties and for poor consistency of the product. Heating the tomato macerate to above 180° F. (82° C.) deactivates these pectin enzymes. Since polygalacturonase does not break down highly methylated pectins, it is dependent upon pectin-methylesterase to provide pectin acid substrate. Deactivation of pectin-methylesterase therefore blocks action by polygalacturonase and indirectly prevents breakdown of pectic substances in tomato products during processing. It is common industry practice to process fresh tomatoes initially at a temperature of at least about 180° F. (82° C.) to deactivate the pectin enzymes and prevent breakdown of pectic substances. A formulated tomato product is often packed in a separate processing operation later in time using the deactivated tomato macerate as an ingredient. However, this operation is also commonly conducted at high temperatures of at least about 180° F. (82° C.) or more in order to sterilize the product. High temperature processing can lead to loss in flavor. See U.S. Pat. No. 3,549,384 of Walker et al., issued Dec. 22, 1970; and McColloch, R. J., et al., *Food Technology*, Vol. 3, pp. 94–96 (1949), and Vol. 4, pp. 339–343 (1950).

In contrast to enzyme reactions causing thin product consistency in the processing of fresh tomatoes, enzyme reactions promote firming of product in the processing of some fruits and vegetables. The enzyme, pectin methylesterase, is activated during low-temperature blanching at 158°–180° F. (70°–82° C.), and inactivated during high-temperature blanching at 190°–212° F. (88°–100° C.) Pectin methylesterase hydrolyzes esterified methanol (sometimes referred to as methoxyl groups) from carboxyl groups on pectin to yield pectinic and pectic acids. Pectin lacks substantial numbers of free carboxyl groups, rendering it water soluble and free to migrate from the cell wall. Pectinic acid and pectic acid possess large numbers of free carboxyl groups and they are relatively insoluble, especially in the presence of calcium ions. As a result, in the absence of the active enzyme polygalacturonase they remain in the cell wall during processing and produce firm textures. Firming effects through activation of pectin methylesterase have been observed for snap beans, potatoes, cauliflower, and sour cherries. These effects occur for products which do not contain active polygalacturonase and which are packed substantially whole as opposed to the macerated tomatoes used in the preparation of juices, sauces, and the like of the present invention. Addition of calcium ions in conjunction with enzyme activation leads to additive firming effects. See *Principles of Food Science, Part I—Food Chemistry*, O. R. Fennema, Ed., Marcel Dekker Inc., New York, N.Y. p. 482 (1976).

Excessive thermal processing of tomato products can lead to loss in flavor acceptability due to the development in the product of burned and browned flavors, as well as other thermal reaction off flavors. Acidification of such products to a pH of 4.6 or below renders them microbiologically safe if the products are sealed into containers at elevated temperatures, and held for sufficient time to destroy microorganisms prior to cooling. Sognefest et al., *Food Technology*, Vol. 1, p. 78 (1947), describe a method of canning tomato juice and tomato juice cocktail at a pH below 4.5 which employs high-temperature-short-time processing in a heat exchanger prior to filling in cans. Decreasing the processing time at which the product is maintained at elevated temperatures reduces loss of valuable flavor components.

When preparing tomato products from ingredients such as tomato paste, crushed tomatoes, and the like, which are substantially free of active enzymes due to previous processing, it is desirable to employ low processing temperatures followed by a high-temperature-short-term sterilization in order to minimize flavor loss by minimizing the cumulative time the product is maintained at elevated temperatures. It has now been determined that when a tomato product made from tomato paste or similar ingredients substantially free of active enzymes due to previous processing is combined with one or more members of the Allium botanical genus, in particular, onion, garlic, or a mixture thereof, and processed at a temperature range below about 160° F. (71° C.) to reduce loss of flavor, a thick gel is formed throughout the product upon cooling. The tomato product without added onion or garlic when subjected to the same processing conditions results in product of normal consistency. It is unexpected that allium causes gel formation in tomato products. The prevalent practice of quickly raising the process temperature to above 180° F. (82° C.) explains why gel formation in tomato products due to onion and garlic has not been noted in commercial practice. Even if the allium were added when the tomato product is below about 160° F. (71° C.), the temperature is raised so quickly that gel formation does not occur.

The occurrence of the gels during low temperature processing of tomato products containing allium suggests that pectin enzymes are present in onion and garlic. The prior art teaches product firming is promoted for some fruits and vegetables, packed substantially whole, in the temperature range of 160° F. (71° C.) to 180° F. (82° C.) due to activation of pectin methylesterase. It has now been determined, however, that for tomato products processed at a temperature range of from about 160° F. (71° C.) to 180° F. (82° C.), with or without added onion or garlic, thick gelling not occur. It is unexpected that gel formation in tomato products containing allium can be prevented by processing in this temperature range which is associated with promoting product firming.

"Normal consistency" is used herein to mean that consistency obtained by current commercial practices wherein the tomato pectin enzymes have been deactivated by heating. "Tomato product" is used herein to mean a product containing tomatoes wherein the tomato pectin enzymes have been deactivated by heating when freshly cut or crushed.

Thick gelling or firming of a tomato product, such as a juice or sauce, can render the product unacceptable to consumers despite better flavor due to the low temperature processing. However, the gelling can be advantageous to a product wherein enhancement of its colloidal properties is desirable. Previous known methods for controlling tomato product consistency involve adding or eliminating water to change the level of tomato solids present. The process of the present invention is advantageous in that product consistency can be controlled without altering the level of tomato solids in the product. Enhancement of product consistency without increasing the level of tomato solids could be an economical means of improving the texture of some products. A method for processing tomato-based products containing onion, garlic, or a mixture thereof, primarily at a low temperature range to prevent loss of flavor, wherein the product consistency can be optimized, is desirable.

Accordingly, it is an object of this invention to provide a method for minimizing flavor loss and controlling the consistency of a tomato product processed primarily at temperatures below the current commercial practice of 180° F. (82° C.) and above prior to sterilization when allium, in particular, onion, garlic, or a mixture thereof, is present.

It is a further object of this invention to provide a method for deactivating the gel-inducing properties of allium in the presence of tomato products.

It is a further object of this invention to provide a method for enhancing the colloidal properties of a tomato product through use of allium without increasing the level of tomato solids present in the product.

These and other objects of the invention will be evident from the following disclosure. All percentages are by weight unless otherwise indicated.

DISCLOSURE OF THE INVENTION

This invention comprises methods for minimizing flavor loss and controlling the consistency of a tomato product processed at a temperature below about 180° F. (82° C.) prior to sterilization while regulating gel formation in the product when one or more members of the Allium botanical genus is present, in particular, onion, garlic, or a mixture thereof, by: (a) pretreatment of the allium; or (b) heating the tomato product to a specific temperature range prior to allium addition; or (c) depolymerizing the tomato pectin substance prior to allium addition.

The processing of the tomato product primarily at a temperature range below about 180° F. (82° C.), as opposed to the prevalent commercial practice of using temperatures above 180° F. (82° C.), aids in minimizing thermal degradation and reducing flavor loss. Preferably, the product is processed at a temperature range below about 160° F. (71° C.). The product is then sterilized using a high-temperature-short-term process to further minimize additional flavor loss.

Normal consistency can be obtained for a tomato product containing allium when processed at a low temperature range to preserve flavor, as opposed to the current commercial practice of using temperatures above 180° F. (82° C.), by deactivating the gel-inducing properties of allium. The gel-inducing properties of allium in the presence of a tomato product processed below a temperature of about 160° F. (71° C.) are preferably deactivated by a pretreatment of the allium. The pretreatment comprises heating allium, or a mixture of allium, in water to a temperature of at least about 160° F. (71° C.) before addition to the cooler tomato product. Gel formation can also be prevented by withholding allium, or a mixture of allium, from the tomato product until the product is at a temperature of at least about 160° F. (71° C.) This method is useful in delaying use of very high temperatures until sterilization, but is not preferred since processing at a temperature range below about 160° F. (71° C.) is desirable to further aid in preventing thermal degradation of product flavor. A third and least preferred means of preventing gel formation is to destroy or depolymerize the tomato pectin substances prior to the addition of one or more allium to products maintained at the preferred low processing temperature range of below about 160° F. (71° C.).

Alternatively, tomato product consistency can be thickened by adding allium under processing conditions that will not deactivate, but instead promote, its gel-inducing properties. Depending upon raw materials, product characteristics desired, processing conditions, and other factors, it may be desirable to enhance the colloidal properties of many tomato products. This can be achieved by adding to the tomato product allium, or a mixture thereof, when the tomato product is at a temperature below about 160° F. (71° C.), and maintaining the product at this low temperature until the desired enhancing effect is achieved. Preferably, pretreatment heating of the allium is omitted, but allium which has undergone a pretreatment which was controlled to prevent complete deactivation of the allium gel-inducing properties can be employed. The product is processed in an overall manner that does not destroy tomato pectin substances prior to addition of the Allium genus member.

Controlling product consistency by regulating gel formation is useful in low-temperature processing of many types of tomato-containing products in which including onion, garlic or other allium is desirable, such as tomato sauce, spaghetti sauce, parmesan sauce, tomato-based vegetable juice, and the like.

DESCRIPTION OF PREFERRED EMBODIMENTS

In the practice of this invention, the food product is processed at a temperature range below about 180° F. (82° C.), preferably below about 160° F. (71° C.) so that thermal degradation of the product is minimized and flavor retention is improved. Product consistency when members of the Allium botanical genus are present can be controlled through use of processing techniques which regulate gel formation in the product.

Hereinafter, the invention will be described with reference to onion and garlic in particular, although it will be appreciated by those familiar with these species that they are members of the Allium botanical genus which contains other food species, such as shallots, chives, and leeks, also included in this invention.

In order to deactivate gel formation in the product which results when one or more members of the Allium botanical genus, in particular onion or garlic, is combined with a tomato product processed at the preferred low temperature range, it is necessary to heat the onion or garlic in water to a temperature of at least about 160° F. (71° C.) before addition to the tomato product. When this heating pretreatment is employed, preferably the onion or garlic is heated in water at about 180° F. (82° C.) for about twenty minutes. Heating at a lower temperature requires a longer time. If the onion or garlic is heated at about 160° F. (71° C.) a minimum heating time of one hour is required. Partial deactivation of the allium gel-inducing properties can be achieved by reducing the temperature or length of time of the pretreatment heating such that the gel-inducing properties of the allium are reduced but not entirely eliminated. For example, heating the allium in water at a temperature less than about 180° F. (82° C.) for less than 20 minutes or heating the allium in water at a temperature at or below about 160° F. (71° C.) for less than an hour results in incomplete deactivation. Pretreatment heating of the onion or garlic in the dry state is not adequate to prevent gel formation.

Gel formation is also prevented when the allium, in particular onion or garlic, is added to the tomato product after the tomato product has been heated to at least about 160° F. (71° C.). Preferably, the temperature is at or above this minimum at the time of allium addition. However, if the allium is added when the product is slightly below about 160° F. (71° C.) and the product is then quickly heated to 160° F. (71° C.) or above, gelling will not occur. If the onion or garlic is added to a tomato product that was previously heated to 180° F. (82° C.) or above, and then cooled to below about 160° F. (71° C.) at the time of allium addition, gelling will occur throughout the product upon further cooling. Addition of onion or garlic to the tomato product which has already undergone sterilization after the tomato product has cooled to below about 160° F. (71° C.) will likewise cause gelling. Once the gel has been formed, subsequent sterilization at a high temperature will not eliminate it. The gel softens at an elevated temperature but reforms upon cooling the product.

A third method for preventing gel formation is to destroy the tomato pectin substances prior to adding the allium, in particular, onion or garlic, to the product maintained below about 160° F. (71° C.). The addition of pectin enzymes to the tomato product with mild heating, will result in depolymerization of the tomato pectins. If the tomato pectins are destroyed by enzyme reactions followed by addition of onion or garlic to the product when it is below about 160° F. (71° C.), no gelling occurs.

In contrast, for those products in which enhancement of the colloidal properties is desired processing conditions are chosen to promote thickening or gel formation. Thus, pretreatment heating of the onion or garlic is preferably omitted. Also, the temperature and length of time of the preheating treatment can be altered such that the allium gel-inducing properties are reduced but not entirely eliminated. The onion or garlic is added to the tomato product when the latter is at a temperature below about 160° F. (71° C.), and held for a time sufficient to achieve the consistency enhancing effect desired. Higher processing temperatures prior to or subsequent to onion or garlic exposure will not eliminate the increased consistency of the product when cooled to room temperature. When promoting gel formation or thickening, it is important that the tomato product not be processed in a manner that would destroy the tomato pectin substances prior to the addition of the onion or garlic.

Formation of the gel requires about 12 hours when onion is added to the tomato product at a level of about 0.2% by weight or higher. A longer time period of from about 24 hours to about 48 hours is required for gel formation when the onion is present at less than 0.2% by weight. Gels can be formed when onion is present at a level as low as about 0.05% by weight.

When an equivalent amount of garlic is added to the tomato-based product as a substitute for onion, a less firm gel is formed and a longer time period is required for gel formation. When onion or an onion and garlic mixture is present, the gel is formed upon product cooling and is usually complete in approximately 12 hours. When garlic alone is present, approximately from about 24 to about 48 hours are required for gel formation.

While not wishing to be bound by any theory, it is believed that gel formation is the result of reaction between the pectin substances in the tomato and an enzyme present in the onion or garlic, possibly followed by ionic crosslinking or hydrogen bonding between molecules. Onion and garlic are known to contain pectin enzymes. Elimination of the tomato pectin substances prior to the addition of onion or garlic eliminates the gelling. The current commercial practice of processing tomato products at a minimum temperature of about 180° F. (82° C.) explains why gel formation due to onion and garlic enzymes was not previously disclosed. The fact that the activity of the gel-inducing component in onion and garlic is temperature dependent and is effective at onion and garlic levels as low as 0.05% by weight suggests that it is an enzyme. Thus, enzymatically active onion and garlic can be employed to control the consistency of tomato products.

It can be appreciated that still other executions of this invention can be devised without departing from its scope and spirit and without losing its advantages. The following embodiments illustrate the practice of this invention, but are not intended to limit it.

EXAMPLE 1

Example 1 illustrates the formation of gels to enhance the colloidal properties of tomato sauce processed at temperatures below about 160° F. (71° C.).

A tomato sauce product was prepared according to the following formula:

| Ingredient | Weight, Percent |
| --- | --- |
| Water | 50 |
| Tomato paste* | 30 |
| Crushed tomatoes* | 15 |
| Onion powder | 0.5 |
| Garlic powder | 0.1 |
| Other seasonings and minor ingredients | 4.4 |
| Total | 100.0 |

*Pectin enzymes previousy deactivated

The water was first heated to 120° F. (49° C.). The onion powder, garlic powder, and seasonings were added with continuous stirring. The tomato paste was mixed in and the mixture temperature brought back up to 120° F. (49° C.) The other minor ingredients were added with continuous stirring. The crushed tomatoes were mixed in and the temperature returned to 120° F. (49° C.). It was maintained at 120° F. (49° C.) for about 30 minutes. Samples of about 4 ounces were periodically removed and sealed in 8-fluid ounce jars. Upon cooling ambiently, thick gels were formed in all samples such that when removed from its jar each product sample retained the jar shape.

The above procedure was repeated at 140° F. (60° C.) and samples were removed after addition of the tomato paste, and after addition of all ingredients, and sealed in 8-fl. oz. jars. Upon cooling, all samples gelled similar to those processed at 120° F. (49° C.).

The above procedure was repeated at 140° F. (60° C.) except that the ingredient order of addition was as follows: water, tomato paste, crushed tomatoes, seasonings, onion powder, garlic powder, and other minor ingredients. All of the prepared samples gelled similar to those processed at 120° F. (49° C.)

Gelled samples were removed from the sample jars and heated to about 190° F. (88° C.) in a sauce pan. Clean sample jars were refilled with hot product and allowed to cool ambiently. All samples upon cooling regained their original thick gelled consistency.

Gelled samples were retorted for 20 minutes at 250° F. (121° C.). The samples were vigorously shaken to assure total equilibration. Upon cooling, all samples regained their original thick consistency.

The original procedure was repeated at 140° F. (60° C.) except that the onion powder and garlic powder were omitted from the formulas. None of these samples gelled. The samples were of normal consistency.

EXAMPLE 2

Example 2 illustrates that addition of onion to the tomato product when the latter is at 160° F. (71° C.) or higher prevents gel formation, but addition of onion to a tomato product at a temperature less than 160° F. (71° C.) promotes gel formation.

The formula of Example 1 was prepared according to the procedure used in Example 1 except that the temperature was 160° F. (71° C.) instead of 120° F. (49° C.). Thus, the onion powder and garlic powder were added at 160° F. (71° C.). This temperature was maintained for 30 minutes. After cooling, none of the samples gelled. The products were of normal consistency.

The formula of Example 1 was prepared according to the procedure used in Example 1 except that the temperature was 180° F. (82° C.) instead of 120° F. (49° C.). Thus, the onion powder and garlic powder were added at 180° F. (82° C.) and the temperature was maintained for 30 minutes. None of the samples gelled after cooling. They were of normal consistency.

The procedure used in Example 1 was again repeated at 180° F. (82° C.) except that the onion powder was added after the product had cooled to 130° F. (54° C.). Strong gels developed in the samples, which had a very thick consistency.

EXAMPLE 3

Example 3 illustrates that wet preheating of the onion prior to its addition to the tomato product prevents gel formation, but dry preheating does not.

Five grams of powdered onion was heated in 78 grams of water for 20 minutes at 180° F. (82° C.). The formula of Example 1 was prepared according to the procedure of Example 1 using a temperature of 130° F. (54° C.). The hot hydrated onion powder was used in place of the dry onion powder listed in the formula. Gels did not develop in the samples upon cooling. The products were of normal consistency.

Dry powdered onion was heated in a forced air oven at 180° F. (82° C.) for 30 minutes. The pretreated onion, in an amount as in Example 1, was added to a mixture of tomato paste and water at 130° F. (54° C.) and maintained at that temperature for 30 minutes. Sample jars were filled as in Example 1 and cooled ambiently. Gels formed in the samples upon cooling. The product colloidal properties were greatly enhanced.

EXAMPLE 4

Example 4 illustrates that destruction of tomato pectin prior to the addition of onion to the tomato product prevents gel formation.

A control sample was prepared using the formula and procedure of Example 1 except that the temperature employed was 130° F. (54° C.). A test sample was prepared according to the formula and procedure of Example 1 except that 500 ppm pectinase was substituted for the powdered onion and the temperature employed was 130° F. (54° C.). The control and test samples were sealed into 32-fl. oz. jars, cooled, and held for 24 hours. All samples were then heated to 180° F. (82° C.) for 30 minutes to inactivate the added enzyme in the test samples. Upon cooling to 130° F. (54° C.), 0.5% by weight of powdered onion was added to the test sample. The temperature of all samples was maintained at 130° F. (54° C.) for 30 minutes, and the samples were allowed to cool ambiently for about 12 hours. No gel developed in the test samples since the tomato pectin had been depolymerized by the pectinase. Gels developed in the control samples which had a greatly enhanced consistency.

EXAMPLE 5

Example 5 illustrates that garlic forms a weak gel in tomato products processed at low temperatures in the absence of onion.

The formula of Example 1 was prepared according to the procedure of Example 1 except that 0.5% by weight of powdered garlic was substituted for the powdered onion and the processing temperature was 130° F. (54° C.). After cooling ambiently for about 12 hours, gels had not formed in the samples. After an additional 48 hours weak gels had formed throughout the product samples, enhancing their consistency.

What is claimed is:

1. A process for minimizing flavor loss and controlling the consistency of a tomato product containing one or more members of the Allium botanical genus, comprising:
    (a) maintaining a tomato product containing at least one or more tomato components in which naturally occurring pectin enzymes have been deactivated at a temperature below about 180° F. (82° C.) prior to sterilization;
    (b) controlling consistency in the tomato product by one of the following:
        (1) heating one or more members of the Allium botanical genus in water to a temperature of at least about 160° F. (71° C.) prior to its addition to the tomato product; or
        (2) bringing the tomato product to a temperature of at least about 160° F. (71° C.) at which temperature one or more members of the Allium botanical genus will be added; or (3) depolymerizing pectin substances naturally occurring in the tomato components by adding pectin enzymes with mild heating to a temperature below about 160° F. (71° C.) prior to addition of one or more members of the Allium botanical genus;

(c) adding the Allium to the tomato product; and (d) sterilizing the product.

2. A process according to claim 1 wherein flavor loss is minimized by maintaining the tomato product minus the allium below about 160° F. (71° C.) prior to sterilization.

3. A process according to claim 1 comprising deactivating gel formation in the tomato product by adding the allium after pretreatment wherein the allium is heated in water to a temperature of at least about 160° F. (71° C.) for about one hour.

4. A process according to claim 3 wherein the allium comprises onion, garlic, or a mixture thereof.

5. A process according to claim 1 comprising deactivating gel formation in the tomato product by adding the allium after pretreatment wherein the allium is heated in water to a temperature of about 180° F. (82° C.) for about 20 minutes.

6. A process according to claim 5 wherein the allium comprises onion, garlic, or a mixture thereof.

7. A process according to claim 1 comprising partially deactivating gel formation in the tomato product by adding the allium after pretreatment wherein the allium is heated in water at a temperature and time insufficient to entirely eliminate the allium gel-inducing properties.

8. A process according to claim 7 wherein the allium comprises onion, garlic, or a mixture thereof.

9. A process according to claim 2 comprising preventing gel formation in the tomato product by (a) depolymerizing the tomato pectin substances by adding pectin enzymes with mild heating to a temperature below about 160° F. (71° C.); and (b) adding one or more allium.

10. A process according to claim 9 wherein the allium comprises onion, garlic, or a mixture thereof.

11. A process according to claim 9 wherein (a) pectin enzymes are added to the tomato product and activated by mild heating for a time sufficient to permit depolymerization of the tomato pectin and (b) one or more allium is added.

12. A process according to claim 1 comprising promoting gel formation in the tomato product by:

(a) adding the allium to the tomato product when the tomato product is at a temperature below about 160° F. (71° C.); and (b) maintaining the tomato product below about 160° F. (71° C.) for a time sufficient to achieve the consistency enhancing effect.

13. A process according to claim 12 wherein the allium comprises onion, garlic, or a mixture thereof.

14. A process according to claim 12 wherein the gel-inducing properties of the allium have been partially deactivated by a pretreatment comprising heating the allium in water at a temperature and time insufficient to entirely eliminate the allium gel-inducing properties.

* * * * *